United States Patent
Harris et al.

[15] 3,680,098
[45] July 25, 1972

[54] LARGE DYNAMIC RANGE COHERENT RADAR PROCESSOR

[72] Inventors: Paul E. Harris; George E. Mader, both of Syracuse, N.Y.

[73] Assignee: Syracuse University Research Corporation, Syracuse, N.Y.

[22] Filed: Nov. 4, 1970

[21] Appl. No.: 86,906

[52] U.S. Cl...................................343/7.7, 343/5 PD, 343/8
[51] Int. Cl..........................................................G01s 9/42
[58] Field of Search..............................343/5 R, 5 PD, 7.7, 8

[56] References Cited

UNITED STATES PATENTS 3,046,548   7/1962   Briskin.....................................343/7.7

*Primary Examiner*—T. H. Tubbesing
*Attorney*—Bruns & Jenney

[57] ABSTRACT

A processor for a coherent radar detecting direction of motion can distinguish between targets which oscillate from those having net motion and uses a radar which splits the received signals into two equal parts containing doppler components, shifting one part by 90°. The invention is embodied in the processor whose inputs are these doppler components, usually audio or subaudio frequency signals. The processor shifts the relative phase of the doppler components an additional 90° and combines the shifted components in sum and difference circuits, thus isolating signals due to outgoing target motion in one channel and signals due to incoming target motion in the other channel. The separated signals are then detected, integrated, and combined so as to measure net motion of a moving target. The net motion signal is then applied to a threshold detector whose output indicates an alarm. Unity gain circuitry is used, avoiding automatic gain control whose adaptation time is sometimes prohibitively long.

5 Claims, 3 Drawing Figures

LARGE DYNAMIC RANGE COHERENT RADAR PROCESSOR

BACKGROUND OF THE INVENTION

This invention relates to an improved coherent radar processor capable of distinguishing between oscillating target signals, such as caused by moving foliage, and signals from targets having a unidirectional net motion such as personnel or vehicles moving through dense foliage.

Coherent radar apparatus, which show the direction of target motion as well as vector and range, such as that described by Kalmus in U.S. Pat. No. 2,934,756, issued Apr. 26, 1960 and by Varian and Kalmus in U.S. Pat. No. 3,024,456, issued Mar. 6, 1962, minimize the masking effect of oscillating foliage but such prior art radars do not successfully handle both very large targets and very small targets. A successful processor should handle a large dynamic range in input signal levels.

Previous attempts to handle the dynamic range problem have all included in the processor automatic gain control circuitry which itself introduces severe performance limitations under certain conditions. Automatic gain control operates as a feedback system after the fact, some time after the feedback is first needed and, in one known processor, the delay is several minutes. As a result false alarms are frequent and reduced system sensitivity follows sudden changes in the raw radar data.

SUMMARY OF THE INVENTION

Any successful processor must handle a wide dynamic range of input signal levels without saturation. Furthermore, it is desirable that human judgment not be involved in the alarm decision; that is, that the apparatus be automatic in assigning alarm criteria and in reporting alarms. These requirements have been met in prior systems by adaption techniques such as automatic gain control levelers. Automatic gain control requires an adaption time that is prohibitively long in some applications. The new processor avoids use of automatic gain control and its problems by the use of unity gain circuitry to avoid saturation; and by cross comparison of signal channels following detection to measure the ratio of signal level between channels. This ratio becomes the new criteria of alarm, not absolute threshold voltage. Thus, unlike older processors, the new processor can instantaneously adapt to violent changes in input signal level.

The processor of the present invention operates on a feed-forward instead of a feedback technique. It eliminates all automatic gain control circuitry by operating most circuits at unity gain; and, by establishing a new criteria of alarm detection. The conventional fixed threshold of alarm is useless without AGC, and has been replaced in this design by a criteria of ratio measurements.

The processor begins in a conventional manner by passing the signals of each channel through a known bandpass filter for limiting the signals to the region of interest, then through a known phase shift filter which imposes a 90° phase lag between the two channels in addition to any existing phase lead or lag between the two, and finally through sum and difference amplifiers, inverting one channel and feeding both channels into second difference amplifiers. At this point, the approaching target Doppler signals are contained in one channel and the receding target Doppler signals are contained in the other channel. This is known design procedure but the processor sections to this point have a unity voltage gain to permit linear operation over a wide range of input signal amplitudes.

The Doppler signals in each channel are then full wave rectified by two half wave operational rectifiers, one of which is preceded by an operational inverter as is known in the art.

The rectified signals are then filtered by a resistor-capacitor combination to smooth the output to a direct current level, buffered, and the two channels are then cross compared by determining the difference between one cannel direct current value and an attenuated direct current value of the other channel to determine if either channel exceeds the opposite channel by the attenuated value. The attenuated value is chosen for each particular radar system and may be any value greater than zero. This attenuator value determines the ratio between channel signals at which a comparison output is produced.

A small dc bias is added at each comparator to insure that system noise will not produce an alarm. This cross comparison ratio measurement is novel and is a key feature in the new design.

Either one channel is larger than the other, or the other is larger than the first, or one channel is larger than the other by less than the chosen, attenuated value. The time average of these three states is determined by integrating the comparator outputs algebraically by a resistor in each channel and a connection in each channel to a common capacitor; one comparator output having been inverted. When both channels are within the attenuated value of each other, the capacitor remains near zero volts. When one channel exceeds the other by a value greater than the attenuated value, the capacitor gains a charge of one polarity or the other. The selection of integration time depends upon the resistor and capacitor chosen and is chosen so that oscillatory foliage motions produce a capacitor voltage averaging to zero for the integration time chosen. Unidirectional target motions, however, will eventually integrate to a net value exceeding a predetermined threshold and indicate an alarm.

The integrator capacitor is continually examined by two comparators employed as alarm threshold devices. One comparator has a negative voltage reference and the other a positive reference. The reference settings are such that both comparator amplifier outputs are negative when the capacitor voltage is near zero but one of the comparator outputs goes positive, indicating an alarm whenever capacitor voltage exceeds a preset threshold.

The output of each of the examining comparators is connected to a meter or other indicator for indicating whether the integrator capacitor is positive or negative. One meter is activated for outgoing alarms and the other for incoming alarms.

DESCRIPTION OF THE PREFERRED EMBODIMENT

Figure 1:
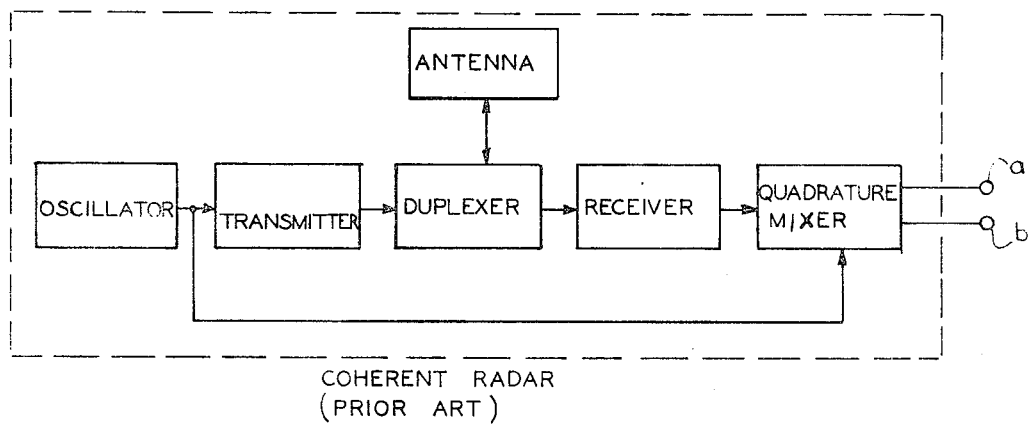
FIG. 1 is a block diagram of the prior art showing the oscillator-transmitter-receiver-mixer combination for generating Doppler signals in phase quadrature in two channels.

Referring to FIG. 1, the apparatus shown in block diagram is well known in the art and more fully explained in the above-mentioned Kalmus and Varian patents. It will be understood by those familiar with the art that the signals at the output terminals $a$ and $b$ are radar Doppler signals in 90° phase relationship in which the signals at the terminal a lead the signals at terminal b by 90° for incoming targets and the signals at terminal a lag those at terminal b by 90° for receding targets.

Figure 2:
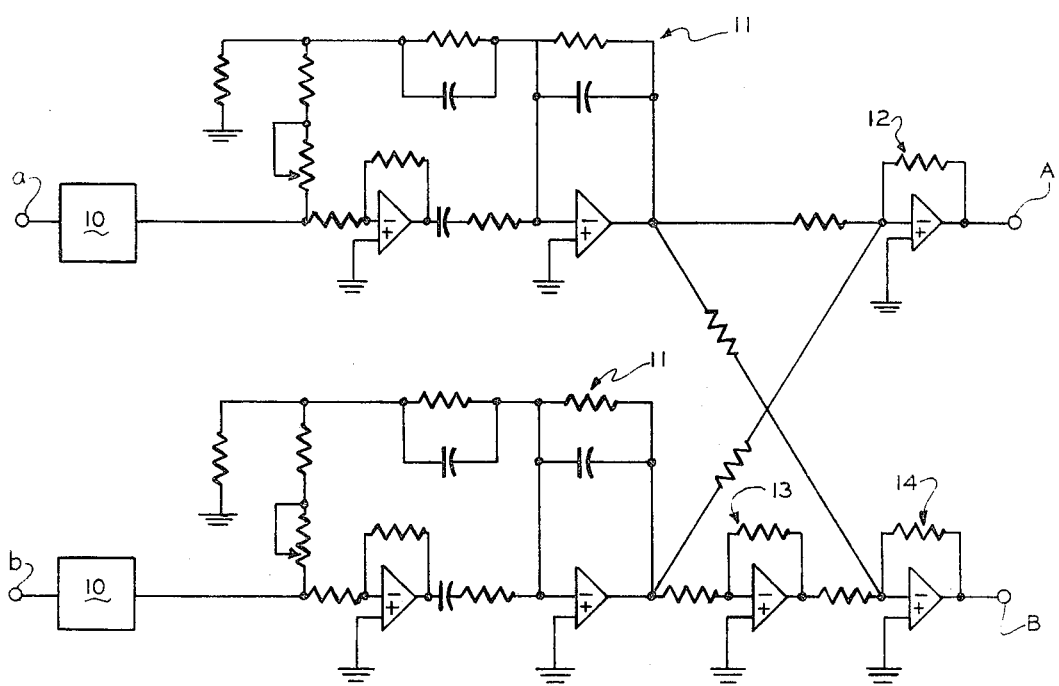
FIG. 2 is a circuit diagram of known means for bandpass filtering, phase shift filtering and adding and subtracting the two channels, without automatic gain control, for separating the Doppler signals from approaching targets into one channel and from receding targets into the other channel.

Referring now to FIG. 2, consistent with present engineering practice, the Doppler signals in each channel $a$ and $b$, connected respectively to terminals $a$ and $b$ of FIG. 1 are first modified by a bandpass filter 10 to limit the signals to the region of interest as determined by the radar application and the expected target velocities. The selection of resistors and capacitors, not shown, in the filter network determines the upper and lower frequency curves, as is well known.

Each channel then has a phase shift filter 11, of a well known type, which imposes a constant 90° phase lag between channel a signals and channel b signals for all frequencies within the bandpass. This additional phase separation is added to any phase lead or lag existing at terminals a and b.

Channel a and b outputs are then added and subtracted by feeding both channels into a difference amplifier 12 and by inverting one channel, the channel b, with inverter 13, and feeding both channels into a second difference amplifier 14. This technique of sorting approaching target Doppler signals and receding target signals into separate channels is disclosed in the above-mentioned Varian and Kalmus patent.

For convenience of illustration, the output of amplifier 12 is connected to a terminal A and the amplifier 14 output is connected to a terminal B. It is to be noted here that the components of the bandpass filter, the phase shift filter, and the sum and difference network are chosen to give a unity voltage gain to permit linear operation over a wide range of signal amplitudes.

Figure 3:
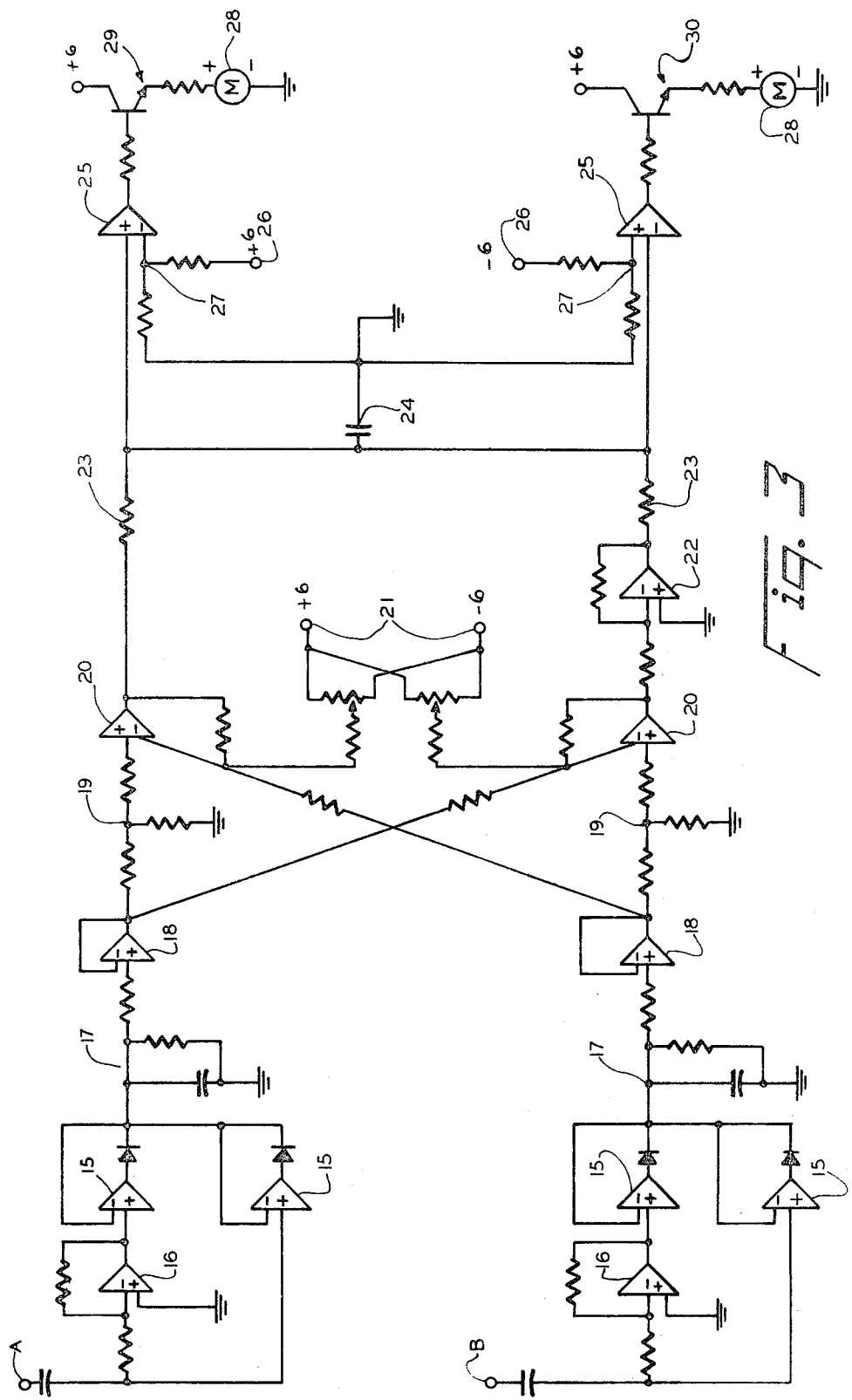
FIG. 3 is a circuit diagram of novel means for comparing, reading and separating oscillatory signals from net change signals and indicating the result.

Referring now to FIG. 3, the Doppler signals are then full wave rectified by two half wave operational amplifier rectifiers 15—15 in each channel, one of which is preceded by an operational amplifier inverter 16. Terminal A, for example, is connected through a series capacitor to the two rectifiers 15—15, one rectifier being preceded by the inverter 16. In channel B the terminal is connected to a like combination. This technique is well known and the signal polarities in each channel are thereby rectified to produce dc pulses.

The rectified signals in each channel are then filtered by the resistor-capacitor combination 17, to smooth the output to a dc level and the output connected to a buffer 18.

The two channels of dc are then cross compared by determining the difference between one channel dc value and an attenuated dc value of the other channel. The attenuation is accomplished by a T network 19 of three resistors following the smoothing network 17 and buffer 18, the output of the T network 19 goes to a comparator amplifier 20. The second input of the amplifier 20 is fed from the buffer in the opposite channel as shown. Similarly, the opposite channel has its attenuator 19, comparator amplifier 20 and unattenuated input.

In this manner, the dc values are continuously compared between channels to determine if either channel exceeds the opposite by the attenuated value. As noted above, the attenuated value is selected for the particular radar system application and may be any value greater than zero.

A small dc bias is added at the input of each comparator 20 from a 6 volt source at 21, as shown, to insure that system noise will not produce an alarm even though the given ratio criteria of 2 decibels, for example, is met.

This mode of difference determination is crucial to the processor of the invention, which has no automatic gain control, because it selects the larger of two inputs regardless of the absolute values of the inputs. Thus continuous and instantaneous selection of the larger signal channel is made possible over a large range of processor input signal amplitudes. An affirmative output, from channel A or channel B comparator 20 indicates the instantaneous direction of motion of the radar target.

The output voltage of each comparator amplifier 20 is digital, depending on input conditions. It will be either a fixed positive voltage or a fixed negative voltage. For an attenuator value of 2 decibels, three combinations are possible. If channel A exceeds channel B by greater than 2 decibels in dc value, channel A will have a positive output from its comparator amplifier 20. If channel B exceeds channel A by greater than 2 decibels in dc value, channel B will have a positive output from its comparator amplifier 20. If channel A and channel B are within 2 decibels or less of their dc values, then both outputs will be negative.

These three states are now integrated algebraically by two resistors 23 and a common capacitor 24.

Channel B has an additional inverter 22 following its comparator 20. This inversion provides a cancelling effect and insures that the voltage on common capacitor 24 will remain near zero when both comparator 20 outputs are negative. For the state when both channels are within the attenuated value of each other, the capacitor 24 remains at its near zero volts quiescent value. Whenever one channel exceeds the other channel by a value greater than the selected attenuations, the capacitor gains charge of one polarity. When the opposite channel exceeds the first, the capacitor gains charge in the reverse polarity. The selection of integration time is determined by the particular radar application and may be of any value.

For optimum detection, the integration time should be almost as long as the desired target is expected to remain under observation by the radar; that is, within the range gate and within the radar antenna beam. This time, of course, depends on the speed and precise direction of the moving target. Integration time must exceed the half period of foliage or other unwanted oscillatory motions which generate energy within the limits of the input bandpass filter. Otherwise, false alarms will be reported. Therefore, foliage motions, being oscillatory in nature, will produce a capacitor voltage which tends to average to zero for integration times which are longer than the oscillation half periods. However, unidirectional target motions will eventually integrate to a net value. In this manner, the net motion, if any, over the integration period is determined.

One of the capacitor reading comparators 25 has a negative voltage reference from the negative terminal 26 of another 6 volt power source 26 and the other comparator 25 has a positive reference from the positive terminal 26. The voltage reference is connected to the second input of the comparator 25 through resistor network 27, as shown. The reference settings are such that both comparator amplifier outputs are negative for the case when both channels are within the attenuated value of each other.

When the capacitor charge increases for a particular polarity, the appropriate comparator will produce a positive output. The comparator input polarities are so chosen so that whenever the capacitor voltage exceeds the positive reference, the channel A comparator changes digitally from a negative fixed voltage to a positive fixed voltage, thus indicating a channel A alarm. Similarly, a sufficient negative voltage on the capacitor produces a positive digital output of the channel B comparator indicating a channel B alarm. Channel A or channel B alarms refer, of course, to net outgoing or net incoming target motions.

The outputs of the comparators 25 are sent to the indicators 28, which are shown here as meters for visual monitoring, powered by transistor circuits 29 and 30, respectively. It will be understood that any other type of indicator or recorder may be substituted.

The processor described above discriminates between unidirectional target motions and oscillatory target motions through sorting and integrating techniques. There is continuous cross comparison so that net motions are instantaneously detected over a wide range of input levels. Automatic gain control, with its attendant time delays is obviated.

What is claimed is:

1. Coherent radar signal processing apparatus capable of instantaneous and continuous determination of net approaching or receding target motions over a large range of input signal amplitudes comprising bandpass and phase shift filtering means for collecting and separating approaching and receding target signals into separate channels, then fullwave rectification means in each channel, and then cross connected means in the channels for cross comparison of the channels.

2. Apparatus as defined in claim 1 in which the cross connected means comprises attenuator means in each of two channels, the output of each attenuator being fed to a comparator whose other input is the unattenuated value of the other channel.

3. Coherent radar signal processing apparatus capable of instantaneous and continuous determination of net approaching or receding target motions over a large range of input signal amplitudes comprising bandpass and phase shift filter means in that order in each of two channels where Doppler signals in one channel lead those in the other for approaching targets and lag those in the other for receding targets by a 90° phase difference, cross connected sum and difference means in the two channels following the filter means or separating approaching target signals into one channel and receding target signals into the other channel, means in each channel for full wave rectifying the separated signals and then smoothing the rectified signals to a direct current level, means in the two channels for cross comparing the channels to determine the difference between each channel and an attenuated direct current value of the other channel including a first pair of comparator amplifiers, the comparator outputs being each connected through resistors to one side of a common capacitor and to the inputs of a second pair of comparator amplifiers, the other input of each of the second pair being connected to opposite voltage biases, and indicator means connected to the output of each of the second pair of comparators for reading the voltage of each of the second pair.

4. Coherent radar signal processing apparatus having band filter means and phase shift filter means in each of two channels for adding a 90° phase lag between channels, a difference amplifier in each channel, one difference amplifier being preceded by an inverter and each difference amplifier being cross connected from the opposite channel for separating approaching target signals into one channel and receding target signals into the other channel, the filter means and amplifiers each having a unity gain, means in each channel for full wave rectifying the separated signals and then smoothing the rectified signals to a direct current level, means in the two channels for cross comparing the channels to determine the difference between each channel and an attenuated direct current value of the other channel including a first pair of comparator amplifiers having a small voltage bias at one input, the comparator outputs being each connected through a resistor to one side of a common capacitor and to the inputs of a second pair of comparator amplifiers, the other input of each of the second pair being given opposite voltage biases, and indicator means connected to the output of each of the second pair of comparators for reading the voltage of each of the second pair.

5. Coherent radar signal processing apparatus having band filter means and phase shift filter means in each of two channels for adding a 90° phase lag between channels, a difference amplifier in each channel, one difference amplifier being preceded by an inverter and each difference amplifier being cross connected from the opposite channel for separating approaching target signals into one channel and receding target signals into the other channel, the filter means and amplifiers each having a unity gain, a full wave rectifier in each channel connected to the output of a respective difference amplifier, a smoothing filter and buffer connected to each rectifier, cross connected means in the channels for cross comparing the channels including a pair of comparator amplifiers, a polarity inverter connected to the output of one of the pair, a common capacitor connected at one side through two resistors to the output of the last named comparators, inverted in one channel, a second pair of comparators each having one input connected to one side of the capacitor, the second input of the second pair being oppositely voltage biased, and separate indicator means for reading the output voltage of each of the second pair of comparators.

* * * * *